United States Patent [19]

Treber

[11] Patent Number: 4,666,546
[45] Date of Patent: May 19, 1987

[54] METHOD FOR VALIDATING SEQUENTIAL ORDERING OF LAMINATE PLIES

[76] Inventor: Gerald C. Treber, 6530 Dublin Circle, Colorado Springs, Colo. 80918

[21] Appl. No.: 788,792

[22] Filed: Oct. 18, 1985

[51] Int. Cl.⁴ .............................................. B32B 31/00
[52] U.S. Cl. ................................................... 156/264
[58] Field of Search ......................... 156/250, 256, 264

[56] References Cited

U.S. PATENT DOCUMENTS

| | | | |
|---|---|---|---|
| 166,284 | 8/1875 | Lovell | 283/37 |
| 3,996,089 | 12/1976 | More et al. | 156/264 |

Primary Examiner—Ivars Cintins
Attorney, Agent, or Firm—Timothy J. Martin

[57] ABSTRACT

A method for validating the ordering of sequential plies in a laminate having a preselected geometrical configuration increases ease of assembly, visual validation and maintenance of a hard record of validation. The technique may readily be implemented by computer aid design techniques. A preliminary pattern is first produced in the desired configuration of the laminate. This preliminary pattern is indexed by selecting an origin location on its perimeter and placing an index marker thereon to define a working pattern. Working patterns for each sequential ply are produced from the first working pattern with the index marker being sequentially shifted along the perimeter in a selected direction away from the origin. A ply is then produced according to each working pattern, and the plies are assembled so that the index markers form an ascending stair step configuration. Preferably a trim boundary is placed on the preliminary pattern as an intermediate step and the index markers are formed as extensions of the trim boundary. After assembly, the article is trimmed to remove the trim boundary thus allowing for cutting error and providing a record of the validation.

20 Claims, 14 Drawing Figures

METHOD FOR VALIDATING SEQUENTIAL ORDERING OF LAMINATE PLIES

BACKGROUND OF THE INVENTION

The present invention relates to the fabrication of laminate materials and particularly is directed to a method for validating the ordering of the plies of laminate material. The method according to this invention contemplates maintenance of a demonstrable record, in the form of a trim sample, as evidence of the ordering of the sequential plies of a laminate material so that the integrity of a selected part may later be demonstrated, if necessary. While the present invention may be applied to the fabrication of any laminate material wherein sequential ply ordering is desirable or critical, this invention finds particular applicability and usefulness in the construction of parts from composite materials, and in particular, when advanced composite materials are used.

A composite material is typically created by the combination of two or more materials which include a reinforcing material, such as a fibrous material, bound together by a resin. Composites can include a variety of material layers in addition to the fiber and resin components. The term "advanced composites", however, is generally understood to refer to composites made of high strength, high-modulus fibers of carbon, aramid or boron bound together by a resin matrix material. The matrix used for a composite may include organic materials, metal, carbon or ceramics. Organic materials comprise the most common composite matrices, and these organics are usually polymer resin matrices which may be either a thermoset polymer resin or a thermo-plastic.

The construction of composite materials is typically one of two types, laminates and sandwiches. Sandwiched material is formed by placing a low density core material between two plies of composite material while laminate materials are plies of composite materials that are bonded together. In each case, these materials offer advantages of strength, weight and rigidity. The present invention is specifically directed to composite laminates as opposed to sandwiched material and to the relative ordering of plies within the bonded composite layers.

When part of an article is fabricated utilizing an advanced composite material, the procedure starts with a partially cured composite ply called a prepreg stock sheet wherein the fibrous material is set in the matrix so that the fibers are aligned parallel to one another. A pattern of the product's shape is cut out and the prepreg plies are then stacked into the desired lamiate geometry. The set of assembled plies is then placed under heat and pressure (autoclave) to be cured so that the laminate plies bond to one another. The direction in which the fibers run in the pe-cured laminate ply is called the grain, and it is often desirable that the sequential plies of a final part have a specific preselected grain orientation with respect to one another. Indeed, engineering specifications may call for a particular series of relative angle orientations among the sequential plies and, when each of the plies is cut out from the stock material, it is rotated to the desired grain direction. Thus, assembly of the plies into the article requires critical attention so that ordering is maintained and the correct sequence obtained.

A problem is encountered in the stacking of the laminate plies prior to autoclaving since there is not convenient way to visually ascertain grain angle to insure that the correct ordering is present. Further, once the laminated part is cured, it is extremely difficult to determine the ordering of the ply layers to insure that the sequential ordering of the plies was followed according to the engineering specifications without error. Further, since validation is difficult, cost of manufacture of complex systems of ply to ply rotation become so expensive that few engineering specifications call for complex rotational callouts despite the advantages to be gained. Thus, there is a great need for a method that will allow for the visual validation of the ply ordering and wherein a permanent record of the validity of ply ordering may be maintained. This method must further be employable by current fabrication techniques which include computer-aided design methods employed with automated tool cutting.

SUMMARY OF THE INVENTION

It is an object of the present invention to provide a novel and useful method for visually validating the sequential ordering of plies in a composite laminate material before and after autoclaving.

It is another object of the present invention to provide a method for visually validating the ply orientation of a composite laminate prior to autoclaving and which allows a permanent record of that validation to be maintained as a validated sample of the laminate.

It is a further object of the present invention to provide a validation method for grain oriented laminates that is inexpensive to employ even for small angular rotations of grain direction to achieve great flexibility and complexity in engineering specifications.

It is yet another object of the present invention to provide a simple and useful technique for preparing a laminate article whereby the method may be readily implemented by computer-aided design manufacturing techniques and accomplished by automated machinery.

To accomplish these objects, the present invention is directed to a method for validating the ordering of sequential plies of a laminate material which plies have a preselected geometric configuration and which are formed into a laminate. The first step of the broad method according to this invention is the production of a preliminary pattern that has a shape geometrically similar to the preselected geometrical configuration of the laminate part to be formed. An origin location is selected along the perimeter of the pattern, and this preliminary pattern is indexed by placing an index marker, in the form of a pattern tab, outwardly of the pattern at the origin location. Preferably, a trim margin is established around the preliminary pattern to define a trim boundary, and the origin location and the index marker are placed on the trim boundary. In this preferred method, then, the index marker projects outwardly of the perimeter of the trim boundary so that the configuration of the trim boundary along with the marker forms a first working pattern from which laminate plies will be cut. The first working pattern is then utilized to produce patterns for each sequential ply but, as each sequential ply pattern is produced, the index marker is sequentially moved a selected distance in a selected direction away from the original along the perimeter of the pattern. According to this method, the index marker of each sequential working pattern is located a greater distance from the origin than the immediately preceding working pattern. A ply is then cut from the stock material according to each working pattern. When the laminate part is assembled as a ply set, correct ordering of sequential layers will yield an ascending stair step configuration of the index markers, with this stair step appearance either going to the left or the right along the perimeter of the material, depending upon the direction selected for shifting the index marker. After the material is autoclaved, the margin is trimmed along the trim boundary to produce a finished part. By labeling both the finished part and the removed trim boundary with common labels, the trim boundary containing the index markers may be preserved as a permanent record of the validity of the ply ordering since the ascending stair step configuration is maintained and may be visually validated even after autoclaving.

In some instances, the part to be fabricated is symmetric so that incorrect ordering is possible even when the fabricator employs the shifting index marker method described above. This problem of symmetry may be overcome by placing one or more false tabs on the perimeter of the trim boundary so that the working pattern and the pieces cut therefrom are not symmetric to rotation about a central axis and are not subject to inversion or "flip" symmetry should the laminate ply cut according to the working pattern be inadvertently flipped from one face to the other.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to a method for permitting visual validation of the ordering of plies used to form a laminate. As discussed below, the method described herein is particularly suitable for fabricating articles of advanced composite materials and may be implemented by computer automated machinery including computer-controlled cutting tools, computer-aided design programs (CAD) and nesting programs.

In order to understand the present method, FIGS. 1-6 are employed for sake of illustration. It should be appreciated, though, that the present inventive method may be employed where any material is used to form a laminate and wherein the plies of the material have an engineered ordering which needs to be followed and validated.

Figure 1:
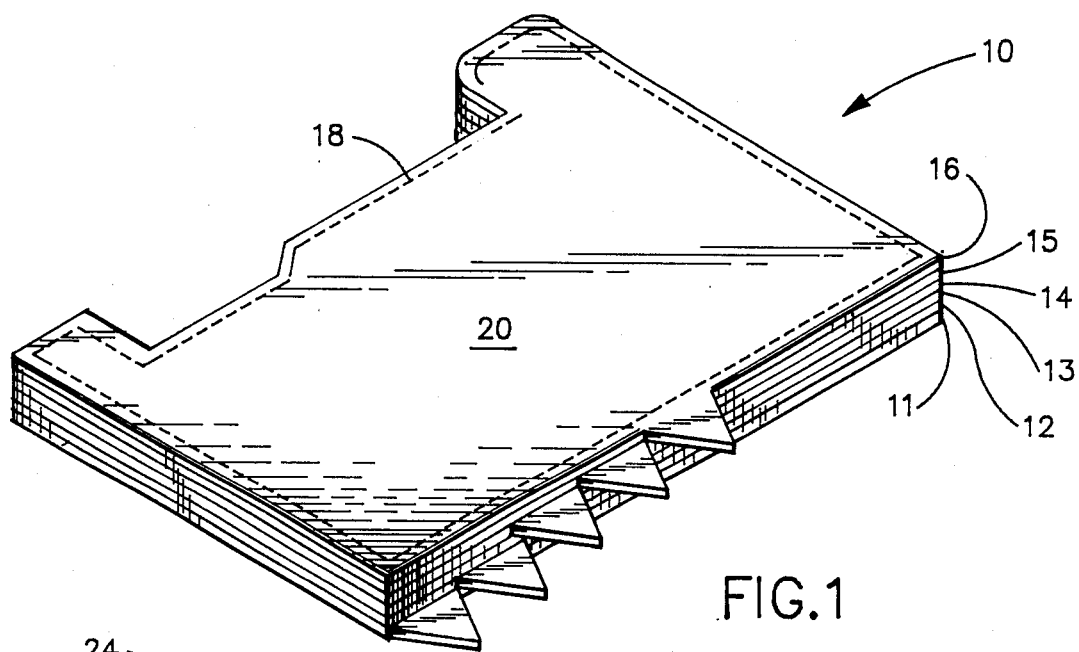
FIG. 1 is a perspective view of a laminate article having the layer of validation according to the preferred method of the present invention.

Thus, as is shown in FIG. 1, a plurality of plies 11-16 define laminate set 10 which is assembled or "stacked" so that laminate set 10 may be autoclaved to join layers 11 16 into a final article represented by perimeter 18 (shown in phantom). Perimeter 18 describes a cut line for the finished article 20 formed from the laminate set 10 after autoclaving. Thus, the shape of the final article is shown by the dotted line 18 with the margin between line 18 and the perimeter of laminate set 10 defining a trim margin for the article.

Figure 2:
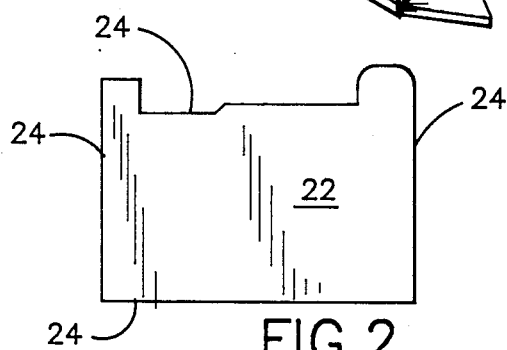
FIG. 2 is a top plan view of a sample ply for the sample article shown in FIG. 1.
Figure 3:
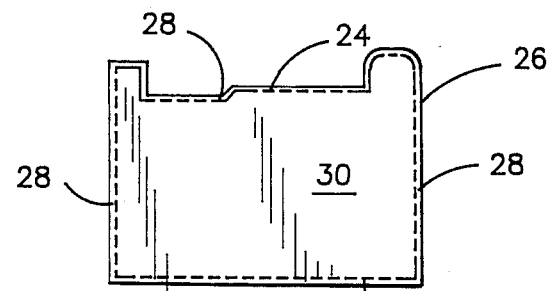
FIG. 3 is a top plan view of the ply shown in FIG. 2 along with the trim boundary.

In order to form laminate set 10, a preliminary pattern of the first ply is constructed to correspond to the preselected geometrical configuration of the laminate ply to be formed. By corresponding to the geometry, it is meant herein that the shape is geometrically similar to or congruent with the ply shape. As is shown in FIG. 2, preliminary pattern 22 is prepared according to the shape of the final article to be formed so that the perimeter 24 of pattern 22 matches perimeter line 18 shown in FIG. 1. After preliminary pattern 22 is formed, and as shown in FIG. 3, a trim boundary 26 is placed around the perimeter 24 so that margin 28 lies between perimeter 24 and trim boundary 26. Margin 28 comprises the excess material that will be trimmed from laminate set 10 after autoclaving to produce finished article 20.

In present procedure, a plurality of plies are described from intermediate pattern 30 and are used to form laminate set 10. A problem arises when each of these plies has different, nonvisual properties since it is difficult to ascertain the proper order of piece parts or plies made from intermediate pattern 30. The present invention solves this problem by providing means for visually validating the ordering of these plies. To this end, a movable index marker is constructed along trim boundary 26 of each ply. The index markers are then cut away as part of the trimmed margin 28.

Figure 4:
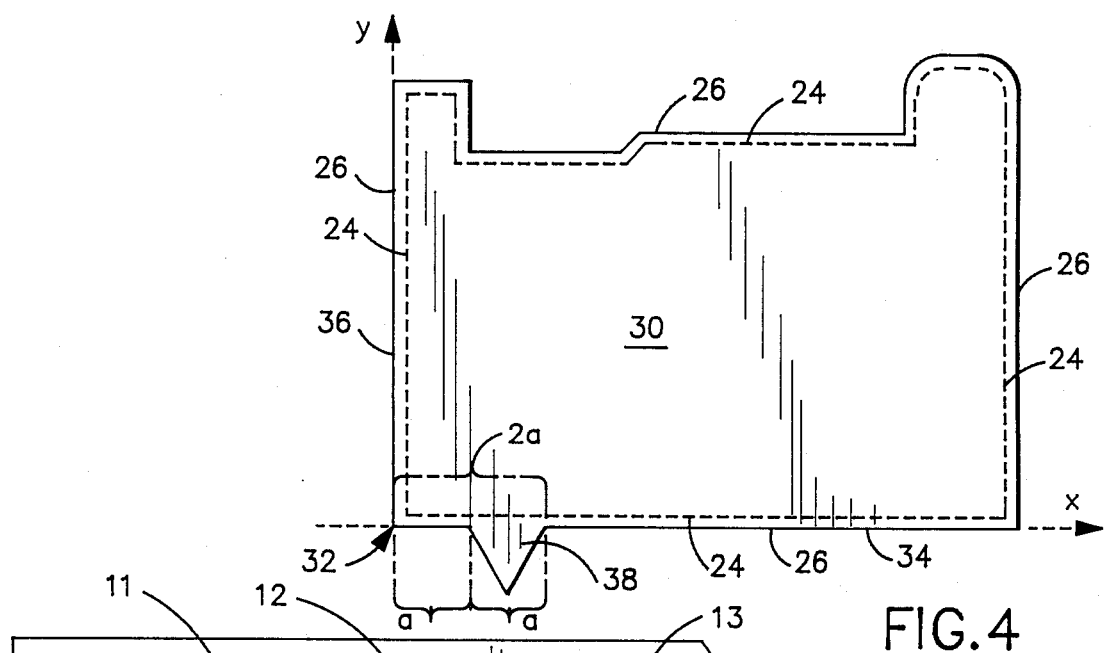
FIG. 4 is a top plan view of the representative ply with trim boundary shown in FIG. 3 along with the indexing marker according to the method of the preferred embodiment.

As is shown in FIG. 4, an origin location, such as origin 32, is selected along trim boundary 26. In FIG. 4, origin 32 is selected at the lower left-hand corner of intermediate pattern 30 at the junction of the X-Y axis formed by bottom edge 34 and side edge 36 of pattern 30. It should be appreciated, though, that the present method can be used by selecting any convenient point of origin along the perimeter of trim boundary 26 so that selection of origin 32 is not confined to this right angle point. Once the origin location is selected on the perimeter of the trim boundary, an index marker, such as marker 38 in the preferred form of an equilateral triangle, is placed on the trim boundary 26 so that it projects outwardly of the perimeter. In FIG. 4, index marker 38 has a width of "a" and is located a distance "a" from origin 32. Thus, index marker 38 starts at coordinate (0,a) and ends at coordinate (0,2a).

Figure 5A:
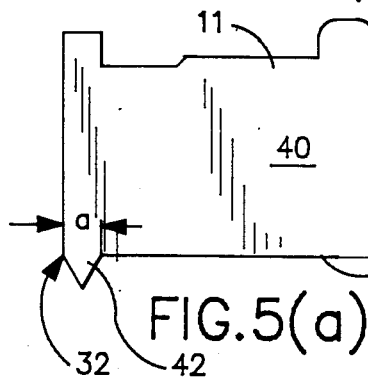
FIGS. 5(a)-5(f) are top plan views showing sequential plies such as that shown in FIG. 4, and manufactured according to the method of the preferred embodiment of the present invention, so that the article shown in FIG. 1 may be constructed.
Figure 5B:
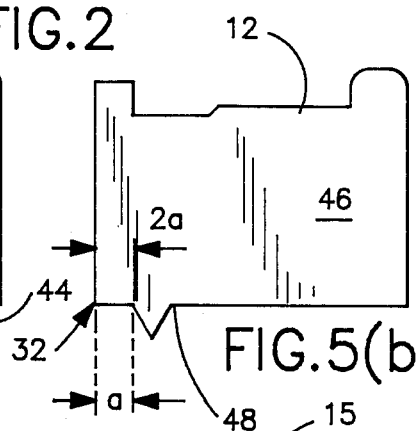
Figure 5C:
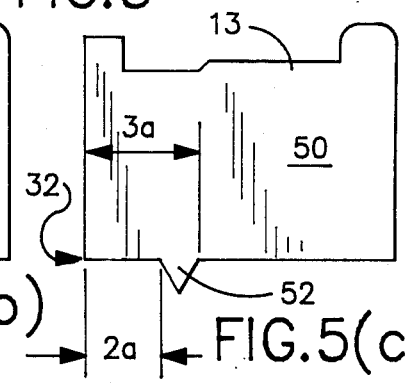
Figure 5D:
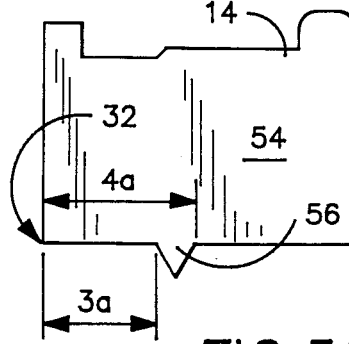
Figure 5E:
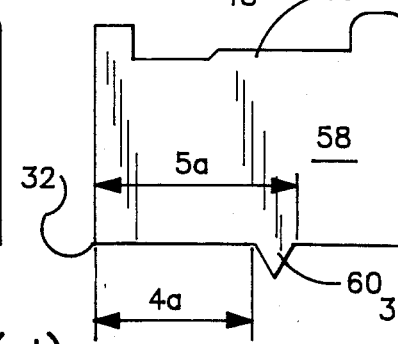
Figure 5F:
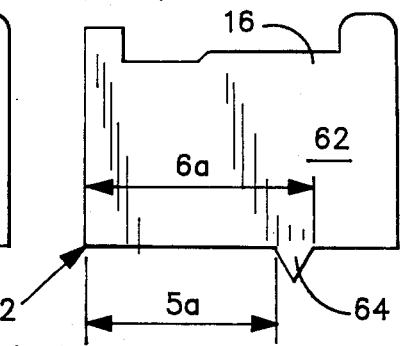

FIGS. 5(a)-5(f) shown successive plies being made out of the first working pattern constructed similarly to FIG. 4. It is preferred, as is shown in FIG. 5(a), that first working pattern 40 has an index marker 42 that is placed at margin 32 so that it extends from the origin to terminate at a distance "a" away from the origin along edge 44. FIG. 5(b) is similar to FIG. 4. Here, pattern 46 includes an index marker 48 that is positioned a distance "a" away from origin 32 and terminates a distance "2a" from origin 32. FIG. 5(c) shows a pattern 50 having an index marker 52 having an initial point a distance "2a" from origin 32 and terminating a distance "3a" from origin 32. FIGS. 5(d), 5(e) and 5(f) continue to show patterns 54, 58 and 62 each having index markers 56, 60 and 64, respectively, that are each moved an additional distance "a" from origin 32.

Figure 6:
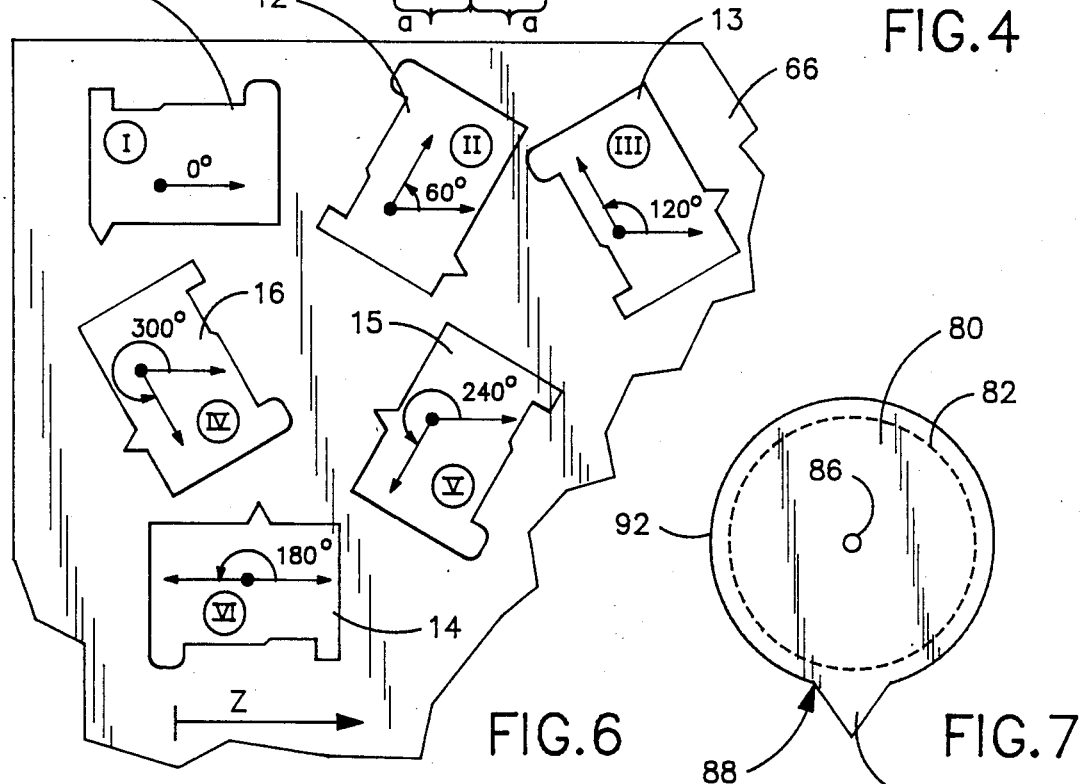
FIG. 6 shows the plies of FIG. 5(a)-5(f) nested on a sheet of stock material prior to cutting.

Once patterns 40, 46, 50, 54, 58 and 62 are constructed, they may be placed in any desired orientation on a sheet of stock material so that plies 11-16 may be cut. As is shown in FIG. 6, stock material in the form of stock sheet 66 is provided and is used to fabricate each of plies 11-16. In typical advanced composite materials, sheet 66 has a grain direction corresponding to the orientation of the fibers. In FIG. 6, this grain direction is indicated by the arrow labeled "Z" so that the grain runs longitudinally of sheet 66. In order to fabricate an article 20 that has high strength per unit weight, it may be desirable, for example only, to use six plies wherein the grain orientation of each sequential ply is angled 60° with respect to the grain orientation of preceding ply. Thus, the six plies 11-16 are designated, respectively, as I-VI and, as is shown in FIG. 6, are rotated with respect to the desired grain orientation so that they are respectively rotated 0°, 60°, 120°, 180°, 240° and 300° to grain direction "Z". When plies 11-16 are cut from sheet 66 and stacked in order, their respective index markers form an ascending stairway from left to right, as is shown in FIG. 1, with the grain orientation of each sequential ply being rotated 60° in a clockwise direction with respect to the preceding ply. It should be appreciated that any degree of angular rotation may be selected and validated by this method. Thus, engineering specifications having more complex angular rotations maybe met without increased manufacturing costs. Therefore, the current industry rotational callout based on either 45° or 60° ply to ply rotation is no longer required and any desired complex system of rotations may be called for, achieved and validated.

The method according to the preferred embodiment of the present invention is particularly suitable for use with computer-aided design programs and nesting routines. To this end, it should be appreciated that the configuration data of preliminary pattern 22 may be placed into memory and the program used to add trim boundary 26 therearound so that margin 28 is provided for a cut with for the actual plies. Thus, the margin data is generated from the configuration data and the design margin space. Intermediate pattern 30 then is displayed on the computer screen and index marker 42 is added after choosing an origin 30 to form the working pattern as stored data; naturally, this working pattern is also displayed as the computer design image. Preferably, the index marker is in the form of a small equilateral triangle and pattern 40 is rotated to give the desired grain orientation desired for the first ply. This first final pattern is then placed into memory and the computer program used to move marker 42 in a direction away from the origin a desired distance, and this next working pattern is then rotated to the desired grain orientation for the second ply. This process of moving the marker a further distance away from the origin is conducted for each sequential ply pattern, and each sequential ply pattern is rotated to the desired grain orientation.

After the data corresponding to each ply is in memory, so that the grain orientation of each ply and its dimensions are known, the operator may apply a nesting routine based upon the inputted parameters of the stock sheet 66 so that the computer will automatically generate data for locating and arranging each ply or a plurality of each ply onto the prepreg stock sheet. This data is then fed into an automatic cutting machine, such as a standard water jet apparatus, which automatically cuts the plies out of stock sheet 66. It is convenient and easy for the plies to be stacked in the proper order since the index markers will visually form the ascending staircase. If one such ply is out of orientation, it is readily apparent to the assembler and the ply can be changed so that proper sequential ordering is obtained. This assembled set is then autoclaved so the plies are bonded to one another, complete with the trim margins and markers. The water jet cutting apparatus may be employed to remove the trim margin and index markers.

This method not only allows for the convenient visual arrangement of plies in correct sequential ordering, but also provides means for maintaining a permanent record that the ply orientation was correct. To this end, the completed article 20 may be labeled in any convenient manner, such as a serial number or the like, and the margin edge containing the index markers may be similarly marked with the identification number. At any subsequent time, reference may be made to the trim edge with the index markers to see that in fact proper grain orientation was present during the manufacturing process. Thus, a permanent physical record is made that the assembler did not error in stacking the plies in the proper order and that the plies did not inadvertently become out of order prior to the autclaving step.

Figure 7:
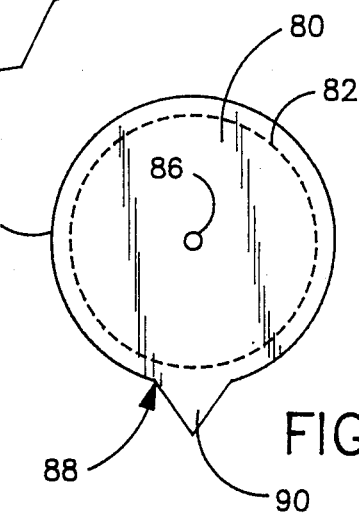
FIG. 7 is a top plan view of a sample ply having both rotational and "flip" symmetry.

In some cases, a ply may be symmetrical about its rotational axis or may be symmetrical upon slipping the piece from one face to an opposite face. This problem can be eliminated by the methods illustrated in FIGS. 7 and 8 of the present invention. Specifically, FIG. 7 shows a circular article 80 defined by perimeter line 82 so that a trim boundary or margin 84 surrounds article 80. Circular article 80 would have a central axis 86. Even if an origin 88 were selected, and an index marker 90 placed adjacent origin 88, as described above, there would be no visual manner of assuring that proper stacking of the plies occurred when the stair step patter was created due to the symmetry of rotation of article 80 about its axis 86.

Figure 8:
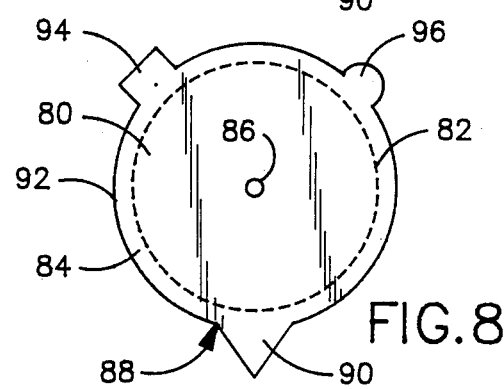
FIG. 8 is a top plan view of the ply shown in FIG. 7 incorporating the symmetry disrupting tabs according to the present invention.

To avoid this problem, the present method contemplates the placement of one or more symmetry disrupting tabs onto the trim boundary 92 of article 80, as is shown in FIG. 8. Specifically, two dissimilar tabs 94 and 96 are placed on trim boundary 92 at any convenient location. These dissimilar tabs disrupt the rotational symmetry about axis 86 so that, once origin 88 is chosen, movement of index marker 90 therefrom results in dissimilar pieces. These pieces are stacked so that tabs 94 and 96 are aligned and with each ply's respective index marker arranged in the stair step manner described with respect to article 20. It is desirable that tabs 94 and 96 be dissimilar to remove the possibility of "flip" or "mirror" symmetry so that, should a ply inadvertently become turned over during the assembly process, such orientation would be readily and visually apparent. To this end, index tab 94 may conveniently be a square tab whereas tab 96 may be a semi-circular tab. This allows tabs 94 and 96 to be readily distinguishable from triangular index marker 90.

Figure 9:
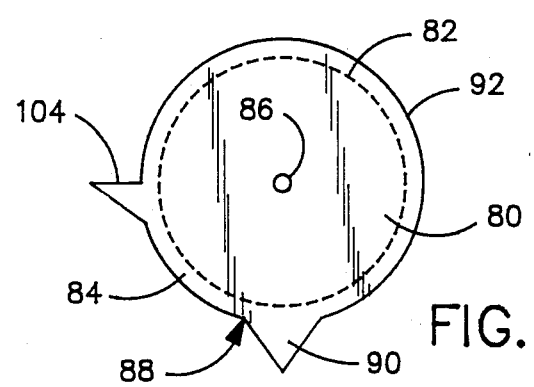
FIG. 9 is a top plan view of the ply shown in FIG. 7 incorporating a single symmetry disrupting tab.

In the alternative, as is shown in FIG. 9, a single disrupting tab could be employed if the single tab were configured in a shape that did not, itself, have symmetry about a line perpendicular to the trim boundary. Here, a single disrupting tab 104 in the shape of a right triangle, is formed on trim boundary 92 and has its base contiguous with trim boundary 92. Tab 104 voids both rotational symmetry about axis 86 and voids "flip" symmetry as well.

According to the foregoing description, it should be appreciated that the method according to the preferred embodiment of the present invention includes the steps of: (1) producing a preliminary pattern having a shape that corresponds to the geometrical configuration of the laminate article to be formed; (2) indexing the preplimnary pattern by selecting an origin location on its perimeter and placing an index marker at the origin with the index marker projecting outwardly of the perimeter of the main body in order form a first working pattern; (3) producing working patterns for each sequential ply by utilizing the working pattern and shifting the index marker of each sequential ply is a selected direction away from the origin location along the perimeter of the ply so that each index marker of a sequential working pattern is located an increased distance from the origin in the selected direction; (4) producing a ply layer of the material from sheet stocks according to each working pattern; and (5) assembling the ply layers so that index markers form a stair step pattern. Preferably, a trim boundary is established around the preliminary pattern, before the origin location is selected, so as to define a trim margin. The origin location is then selected to be on the trim boundary, and the index marker is also placed on the trim boundary.

The method according to the preferred embodiment of the present invention may conveniently be implemented by producing the preliminary pattern by means of a computer-aided design program such that the first four steps are accomplished by the operator's interaction with the computer; a nesting program may then be utilized to mathematically describe the position of each ply to be cut on a material stock sheet and a computer-controlled tool may be used to cut each ply therefrom. In the case of rotationally symmetrical materials, a symmetry disrupting tab may also be placed on the trim boundary and, in the case where a ply to be formed has both rotational and "flip" symmetry, two tabs may be utilized with each tab having a different configuration where a single ply could be utilized wherein the single ply does not have symmetry about the radial line passing therethrough.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A method for validating sequential plies of material have a preselected geometrical configuration to be formed in a laminate whereby the proper order of the plies may be obtained, comprising the steps of:

producing a preliminary pattern having a shape that corresponds to the preselected geometrical configuration of the laminate to be formed;

indexing the pattern by selecting an origin location along the perimeter of the preliminary pattern and placing an index marker at the origin location with the index marker projecting outwardly of the perimeter to form a first working pattern adapted to be used in producing a first one of said plies;

producing working patterns for each sequential ply by utilizing the first working pattern and shifting the index marker of each sequential working pattern in a selected direction away from the origin location along the perimeter thereof, the index marker of each sequential working pattern being located a greater distance from the origin location than the preceding working pattern;

producing a ply of material according to each working pattern; and assembling the plies of material so that said index markers form an ascending stair step configuration.

2. The method according to claim 1 including establishing a trim boundary around the preliminary pattern to define a trim margin prior to selecting the origin location, said origin location being selected on the trim boundary and said index marker extending from the trim boundary.

3. The method according to claim 2 wherein said preliminary pattern is produced as a preliminary pattern display image by a computer utilizing a computer-aided design program wherein the display image corresponds to geometrical configuration data entered into and stored in the memory of said computer.

4. The method according to claim 3 wherein the trim boundary is placed around the preliminary pattern by generating margin data from said configuration data.

5. The method according to claim 4 wherein each working pattern is produced as a working pattern image by said computer and stored as working pattern data in the memory of said computer.

6. The method according to claim 5 including the step of selectively rotating each working pattern about its central axis with respect to a preceding working pattern prior to storing the working pattern data so that at least some of said working patterns are described as rotated with respect to each other.

7. The method according to claim 6 including the step of inputting parameters corresponding to the size of a stock sheet from which said plies are to be produced into said computer and the step of applying a nesting routine to generate placement data for each working pattern on said stock sheet.

8. The method according to claim 7 including the step of utilizing said placement data and working pattern data to cut said plies by means of a computer controlled cutting tool.

9. The method according to claim 2 wherein said geometrical configuration is symmetrical about its central axis, the method including the step of placing a symmetry disrupting tab on the perimeter of the trim boundary projecting outwardly therefrom.

10. A method for validating sequential plies of material having a preselected geometrical configuration to be formed in a laminate whereby the proper order of the plies may be obtained, comprising the steps of:

producing a preliminary pattern having a shape that corresponds to the preselected geometrical configuration of the laminate to be formed;

indexing the preliminary pattern by selecting an origin location along the perimeter of the preliminary pattern and placing an index marker at the origin location with the index marker projecting outwardly of the perimeter;

rotating said preliminary pattern to a desired grain angle for each successive ply while shifting the index marker in a selected direction along said perimeter to create a cutting pattern for each successive ply such that each successive cutting pattern will include an index marker located a greater distance from the origin location along its trim boundary than the preceding ply cutting pattern;

producing a ply of material according to each cutting patern; and assembling the plies of material so that said index markers form an ascending stair step configuration.

11. A method of producing a laminate article having a selected plane geometry from a plurality of plies cut from a stock sheet of material having a defined grain direction wherein each ply has a selected grain angle so that proper ordering of successive plies may be visually validated, comprising the steps of:

producing a preliminary pattern of a ply having the selected plane geometry so that the perimeter thereof defines the plane geometry;

establishing a trim margin around the perimeter of the preliminary pattern to define a trim boundary;

selecting an origin location on the trim boundary and forming an index marker as an extension of the preliminary pattern projecting outwardly of the trim boundary in order to form a working pattern;

rotating said working pattern to a desired grain angle for each successive ply while shifting the index marker in a selected direction along said trim boundary to create a cutting pattern for each successive ply such that each successive cutting pattern will include an index marker located a greater distance from the origin location along its trim boundary than the preceding ply cutting pattern;

cutting said plies from said stock sheet according to each cutting pattern at the grain angle of each cutting pattern, each said ply cut to have an index projection corresponding to its respective index marker;

stacking the plies into an assembled ply set so that the trim boundaries are vertically matched with the index projections from an ascending stair step configuration; and bonding said plies together to construct a prefinished article.

12. The method according to claim 11 including the step of trimming the pre-finished article along the perimeter of the preliminary patterns to remove the trim margin and index projections to construct said laminate article.

13. The method according to claim 12 including the step of identically labeling the finished article and at least the portion of the trim margin portion forms a relatively permanent record of the ply ordering.

14. The method according to claim 11 wherein each successive index projection is moved a distance along the trim boundary that is equal to the width of the index projection measured at the trim boundary.

15. The method according to claim 14 wherein said index projections are formed as triangles that have a base contiguous with the trim boundary.

16. The method according to claim 11 wherein the preliminary pattern, the trim margin, the trim boundary, the working patterns and the cutting patterns are created by computer-aided design and stored as data in a computer's memory and wherein said data is used to control a computer-controlled cutting tool to cut said plies from said stock sheet.

17. The method according to claim 16 wherein the orientation of said cutting patterns on the stock sheet are established by a nesting routine prior to the cutting of the plies.

18. The method according to claim 16 wherein said cutting tool is a computer-controlled water jet.

19. The method according to claim 11 wherein the stock sheet is a prepreg advanced composite ply material, and said step of bonding the plies together is accomplished by autoclaving the assembled ply set.

20. A method of producing a laminate article having a selected plane gemoetry from a plurality of plies defining a ply set and cut from a plurality of plies defining a ply set and cut from a stock sheet of material having a defined grain direction wherein each ply has a selected grain angle so that proper ordering of successive plies may be visually validated, comprising the steps of:

producing a preliminary pattern of a ply having the selected plane geometry so that the perimeter thereof defines the plane geometry;

establishing a trim margin around the perimeter of the preliminary pattern to define a trim boundary;

selecting a common origin location on the trim boundary of said preliminary pattern and forming an index marker as an extension of the preliminary pattern projecting outwardly of the trim boundary thereof, and forming a working pattern for each successive ply, the index marker of each successive working pattern being shifted from its respective origin in a selected direction along a trim boundary such that each successive working pattern will include an index marker located a greater distance from the origin location along its trim boundary than the preceding working pattern;

rotating each said working pattern to a desired grain angle for each successive ply;

cutting said plies from said stock sheet according to each working pattern at the grain angle of each working pattern, each said ply cut to have an index projection corresponding to its respective index marker;

stacking the plies into an assembled ply set so that the trim boundaries are vertically matched with the index projections from an ascending stair step configuration; and bonding said plies together to construct a pre-finished article.

* * * * *